United States Patent

[11] 3,590,437

| [72] | Inventors | Rupert E. Annis, Jr. |
| --- | --- | --- |
| | | Salem; |
| | | Adolph S. Dorosz, Beverly; Richard M. Elliott, Beverly; Frederick S. Sillars, Beverly, all of, Mass. |
| [21] | Appl. No. | 751,147 |
| [22] | Filed | Aug. 8, 1968 |
| [45] | Patented | July 6, 1971 |
| [73] | Assignee | USM Corporation |
| | | Boston, Mass. |

[54] INJECTION MOLDING PRESSES
7 Claims, 7 Drawing Figs.

[52] U.S. Cl. .................................................. 18/30 LA,
18/22, 100/290, 18/30 LV, 18/16 F
[51] Int. Cl. ...................................................... B29f 1/00,
B29c 3/00, B30b 1/18
[50] Field of Search ........................................... 18/16 H, 16
F, 16.5, 22, 23, 30 K, 30 LA, 30 LM, 30, 30 LV,
17, 17 E; 100/219, 290

[56] References Cited
UNITED STATES PATENTS

| 1,997,074 | 4/1935 | Novotny | 18/17 X |
| --- | --- | --- | --- |
| 2,689,978 | 9/1954 | Roger | 18/30 |
| 2,711,157 | 6/1955 | Halward | 92/27 |
| 2,718,662 | 9/1955 | Bohannon et al. | 18/30 |
| 2,773,536 | 12/1956 | Lange | 100/290 (X) |
| 2,841,826 | 7/1958 | Brucker | 264/279 |
| 2,862,238 | 12/1958 | Cuzzi | 18/30 |
| 2,988,778 | 6/1961 | Chaze et al. | 18/30 |
| 3,195,186 | 7/1965 | Gauban et al. | 18/30 X |
| 3,270,372 | 9/1966 | Hesse | 18/30 |

*Primary Examiner*—J. Spencer Overholser
*Assistant Examiner*—R. L. Spicer, Jr.
*Attorneys*—W. Bigelow Hall, Richard A. Wise and Scott R. Foster ABSTRACT: An injection molding press including stationary means for mounting a portion of a mold assembly, movable means for mounting the remainder of the mold assembly for movement toward and away from the stationary mold mounting means, means for moving the movable means whereby to bring the mold assembly portions into engagement or near engagement with one another, and a second moving means for urging the mold members together under high force.

Inventors
Rupert E. Annis, Jr.
Adolph S. Dorosz
Richard M. Elliott
Frederick S. Sillars
By their Attorney

INJECTION MOLDING PRESSES

BACKGROUND OF THE INVENTION

1. Field of the Invention

This invention relates to injection molding machine presses and is directed more particularly to means for closing a mold assembly and maintaining the assembly in a closed condition under high pressures.

2. Description of the Prior Art

In order to obtain the high clamping forces necessary to maintain a mold assembly in the closed condition during a high pressure injection molding operation, rather massive presses have been constructed which generally require an undesirably large amount of floor space, are excessively bulky, expensive to build, and usually expensive to operate and maintain. A frequent further disadvantage is the rather ponderous movements of the machine which restrict the output to a less than desirable rate of production.

SUMMARY OF THE INVENTION

It is an object of the present invention to provide a press for clamping together injection mold assembly members under high forces whereby to facilitate high pressure injection molding.

It is a further object of the invention to provide such apparatus as will accomplish high force clamping of a mold assembly but which affords rapid advancement and retraction of the mold members.

A still further object of the invention is to provide such apparatus having high force clamping means which operates only after the mold members are in abutting or near abutting relationship.

Another object of the invention is to provide such apparatus in which the high force clamping means is relatively small in size and weight.

With the above and other objects in view, as will hereinafter appear, the present invention in one aspect thereof contemplates the provision of high force clamping apparatus including a stationary platen for mounting a stationary mold member, a movable platen for mounting a movable mold member engageable with the stationary mold member, first motive means for rapid advancing and retracting of said movable platen with relation to said stationary platen, second motive means for urging said movable platen toward said stationary platen under high force, and means for releasably interconnecting said second motive means and said movable platen after completion of the operation of the first motive means.

The above and other features of the invention, including various novel details of construction and combinations of parts, will now be more particularly described with reference to the accompanying drawings and pointed out in the claims. It will be understood that the particular machine embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which there is shown an illustrative embodiment of the invention from which its novel features and advantages will be apparent.

DESCRIPTION OF THE PREFERRED EMBODIMENT

Figure 1:
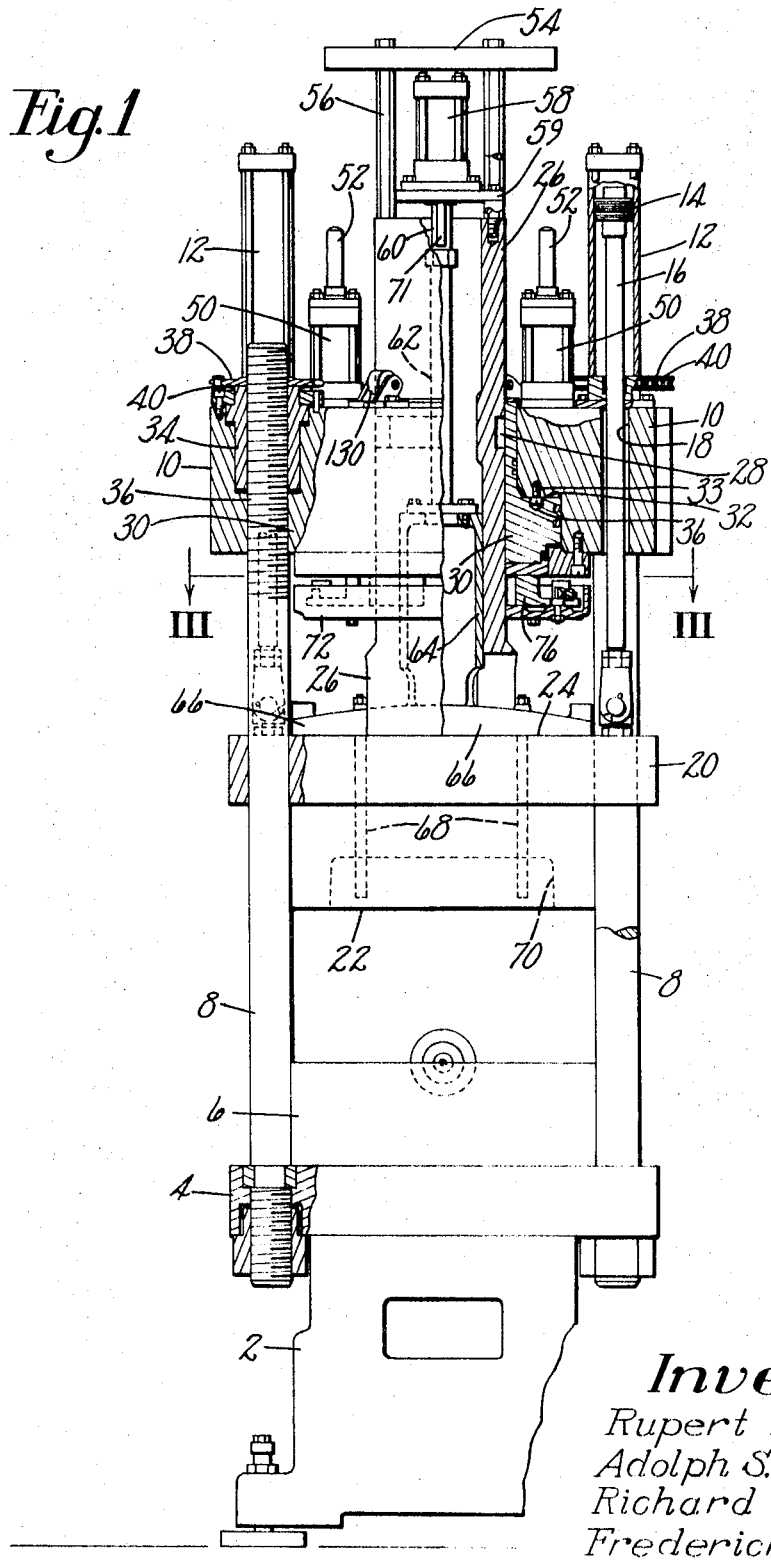
FIG. 1 is an elevational, partially sectional view of one form of injection molding press illustrative of an embodiment of the invention.
Figure 2:
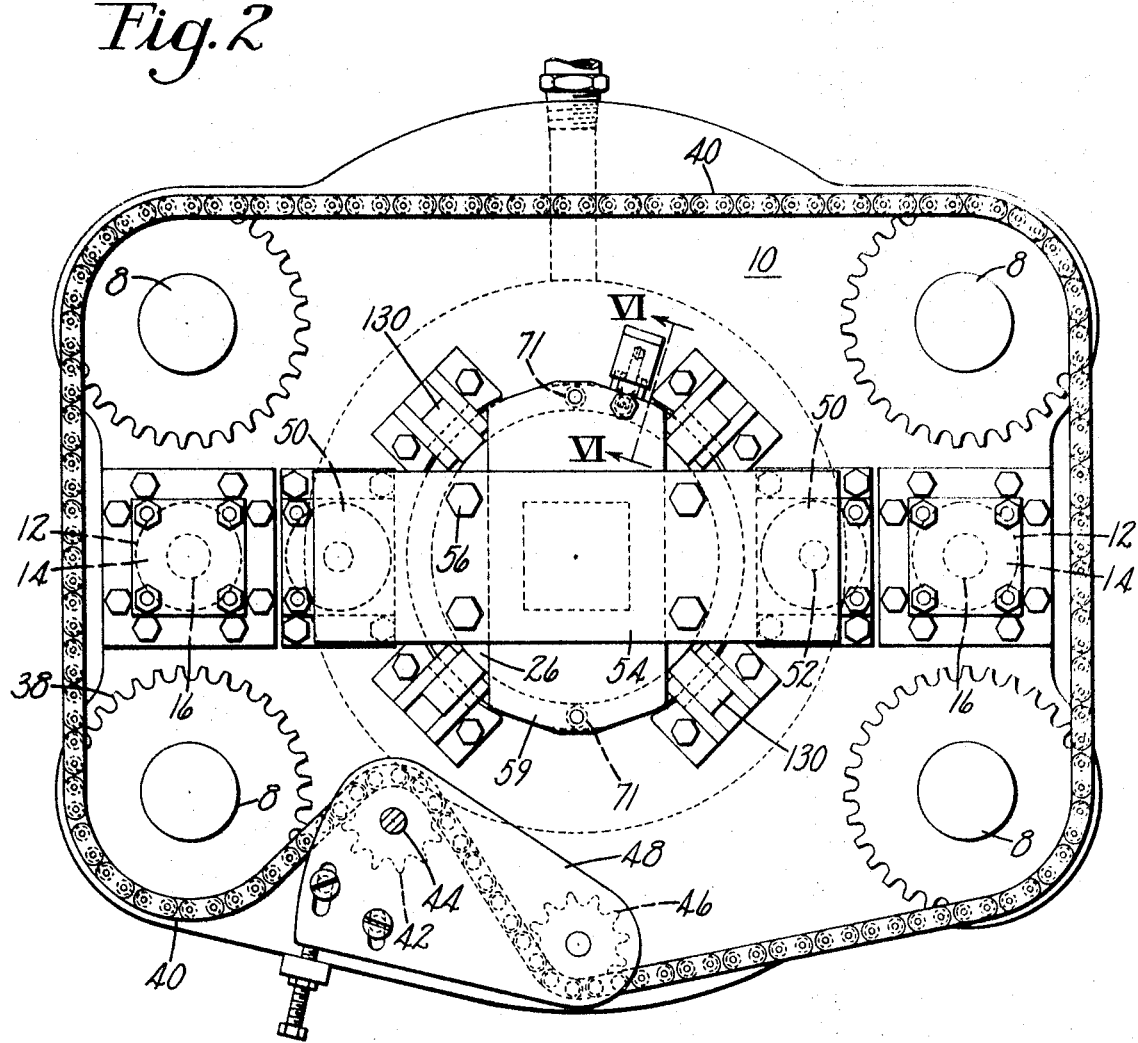
FIG. 2 is a plan view of the apparatus shown in FIG. 1.

Referring to FIG. 1, it may be seen that the illustrative machine includes a base 2 on which is mounted a stationary platen 4 to which is fixed a stationary mold member 6. Four tie bars 8 (FIG. 2) are connected to the stationary platen 4 and extend upwardly therefrom to support an upper platen 10.

The upper platen 10 has mounted thereon a low force drive means comprising a pair of lift cylinders 12 having pistons 14 disposed therein. Connected to the pistons 14 are piston rods 16 which extend through bores 18 in the upper platen 10 and at their lower extremity are connected to a movable platen 20. The movable platen 20 is adapted to retain a movable mold member 22 which is engageable with the stationary mold member 6. On the side 24 of the movable platen 20 there is connected to the platen a central core member 26 having a circumferential groove 28 therein.

Figure 6:
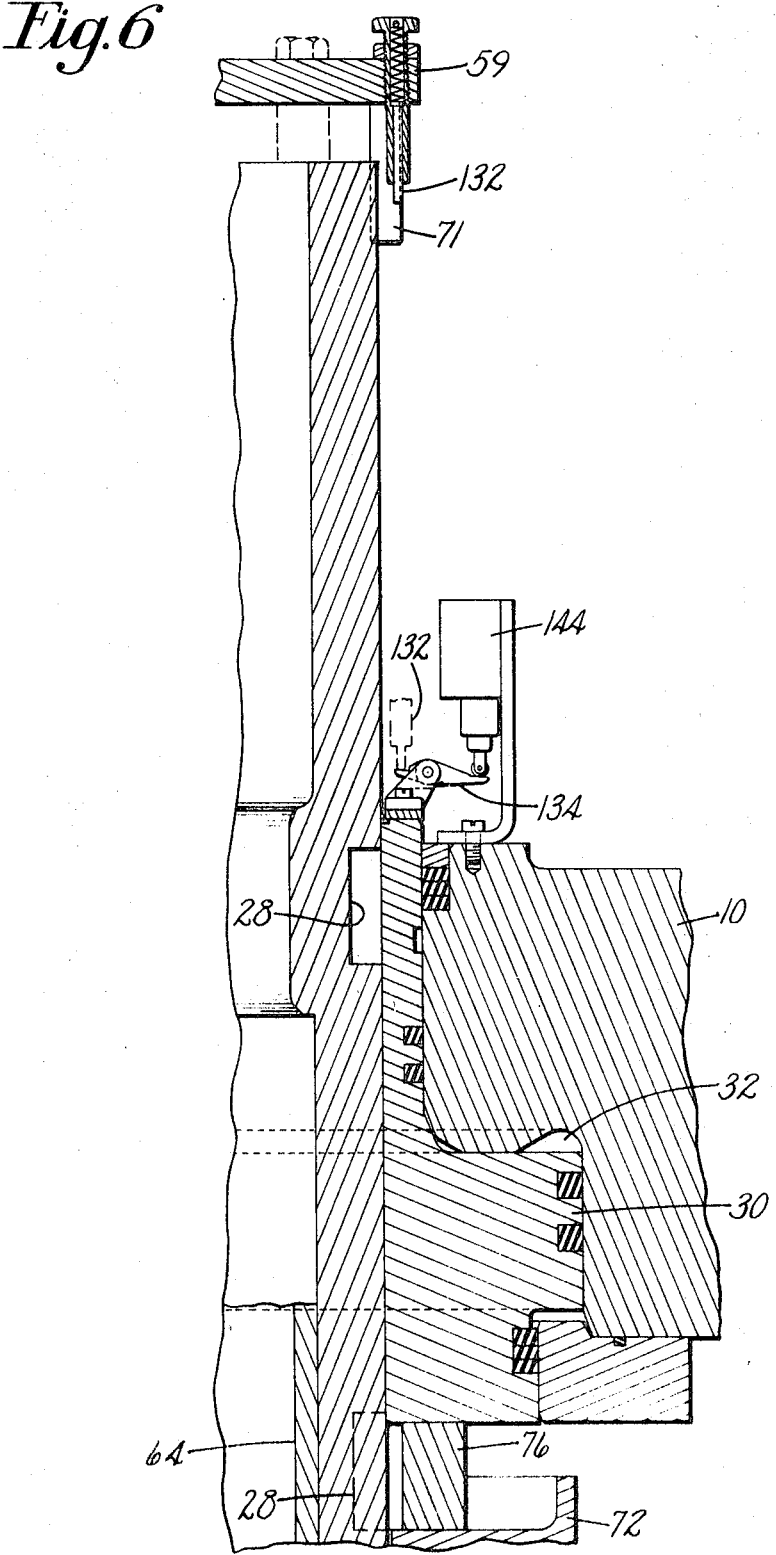
FIG. 6 is an enlarged detailed view, in section, of a portion of the apparatus.

The upper platen 10 is annular in configuration and has slidably disposed within its annulus a collar or clamp piston member (FIGS. 1 and 6) which is shaped generally complementarily to the annulus of the platen 10 with the exception of an annular groove 32. A stud 33 (FIG. 1) projects from the upper platen 10 and is received by a bore 36 in the clamp piston member 30 to prevent relative rotational movement between the piston member 30 and the platen 10. The clamp piston member 30 slidably receives the core member 26.

Mounted in the upper platen 10 are four threaded nut means 34 which are in engagement with external threads 36 on the upper ends of the tie bar 8. The nut means 34 are attached to sprockets 38 (FIG. 2) which may be rotated by a common means, as for example, a drive chain 40 driven by a drive sprocket 42 having a shaft 44 connected to a power source which may be a hydraulic or electric motor, (not shown). A tensioning sprocket 46 may also be utilized in order to maintain the drive chain 40 in a taut condition. Preferably, the drive sprocket 42 and the tensioning sprocket 46 are disposed on an adjustable mounting plate 48 which may be moved or repositioned in order to properly tension the drive chain. By rotating the shaft 44, there is caused a commensurate rotation of the sprockets 38 and therefore the nuts 34. Rotation of the nuts 34 on the tie bars 8 causes the upper platen 10 and all that is fixed thereto to move upwardly or downwardly on the tie bars, depending upon the direction of rotation of the nuts.

Affixed to the upper platen 10 are a pair of supplementary breakaway cylinders 50 having upwardly projecting piston rods 52. A breakaway plate 54 is attached to the upper end of the core member 26 by means of tie rods 56. The piston rods 52 of the breakaway cylinders 50 are engageable with the underside of the breakaway plate 54 to assist in parting the mold members, as will be further described below.

A knockout cylinder 58 is disposed on a mounting plate 59 fixed to the core member 26 and has a piston rod 60 extending therefrom. An extension rod 62 is connected at one end to the piston rod 60 and at its other end to a plunger 64 which is slidably disposed within the tubular core member 26. The plunger 64 has mounted thereon a knockout plate 66 which mounts knockout rods 68 extending through the movable platen 20 and, when the movable platen is in the raised position (FIG. 1), extend into the mold cavity 70 to eject a molded article therefrom. Stop rods 71 fixed to the underside of the mounting plate 59 engage the clamp piston 30 (FIG. 4) to limit the movement of the core member 26.

Figure 3:
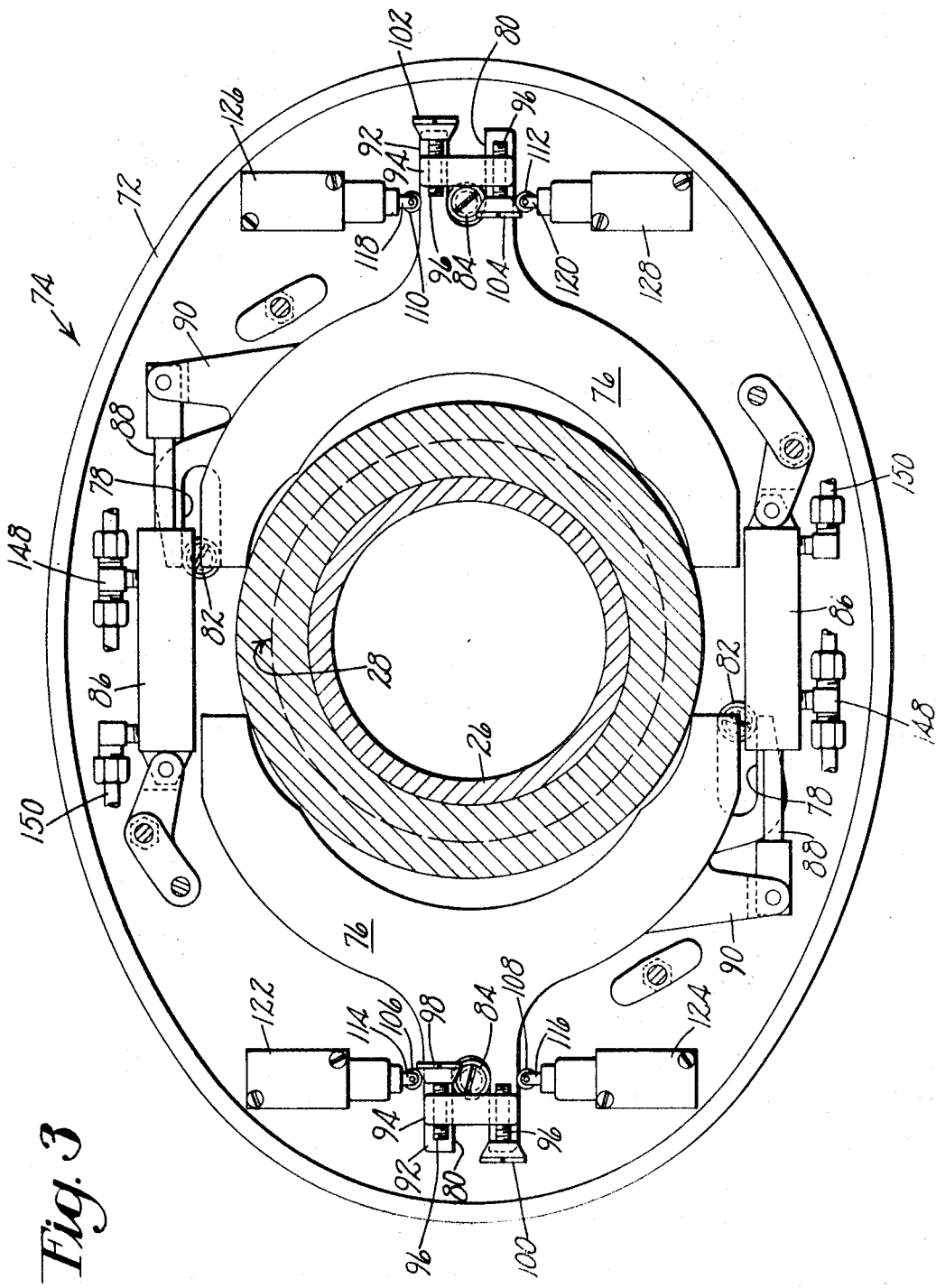
FIG. 3 is a sectional view taken along line III–III of FIG. 1.
Figure 4:
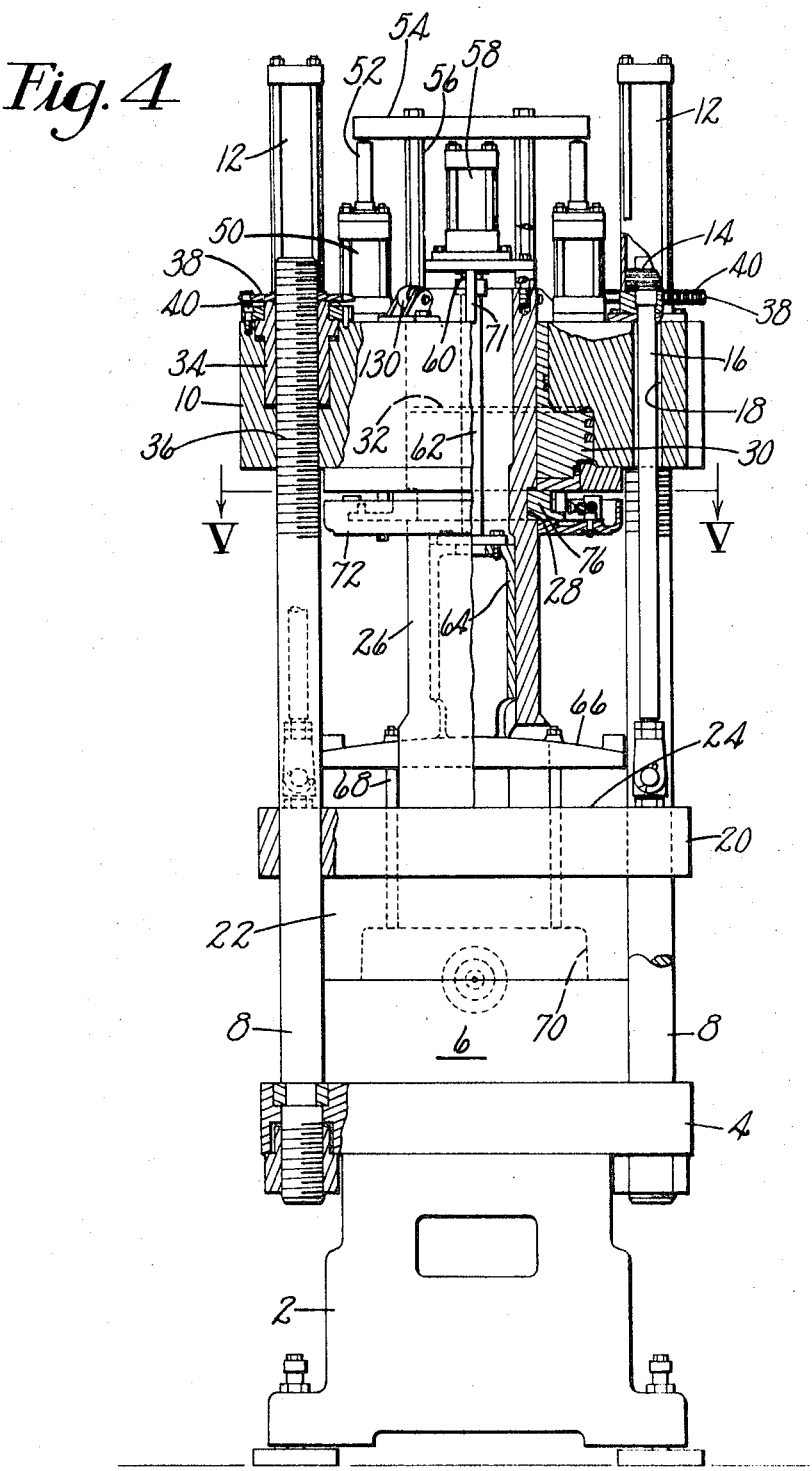
FIG. 4 is similar to FIG. 1, but shows the movable platen at the end of its low force stroke and the high force locking means engaged.
Figure 5:
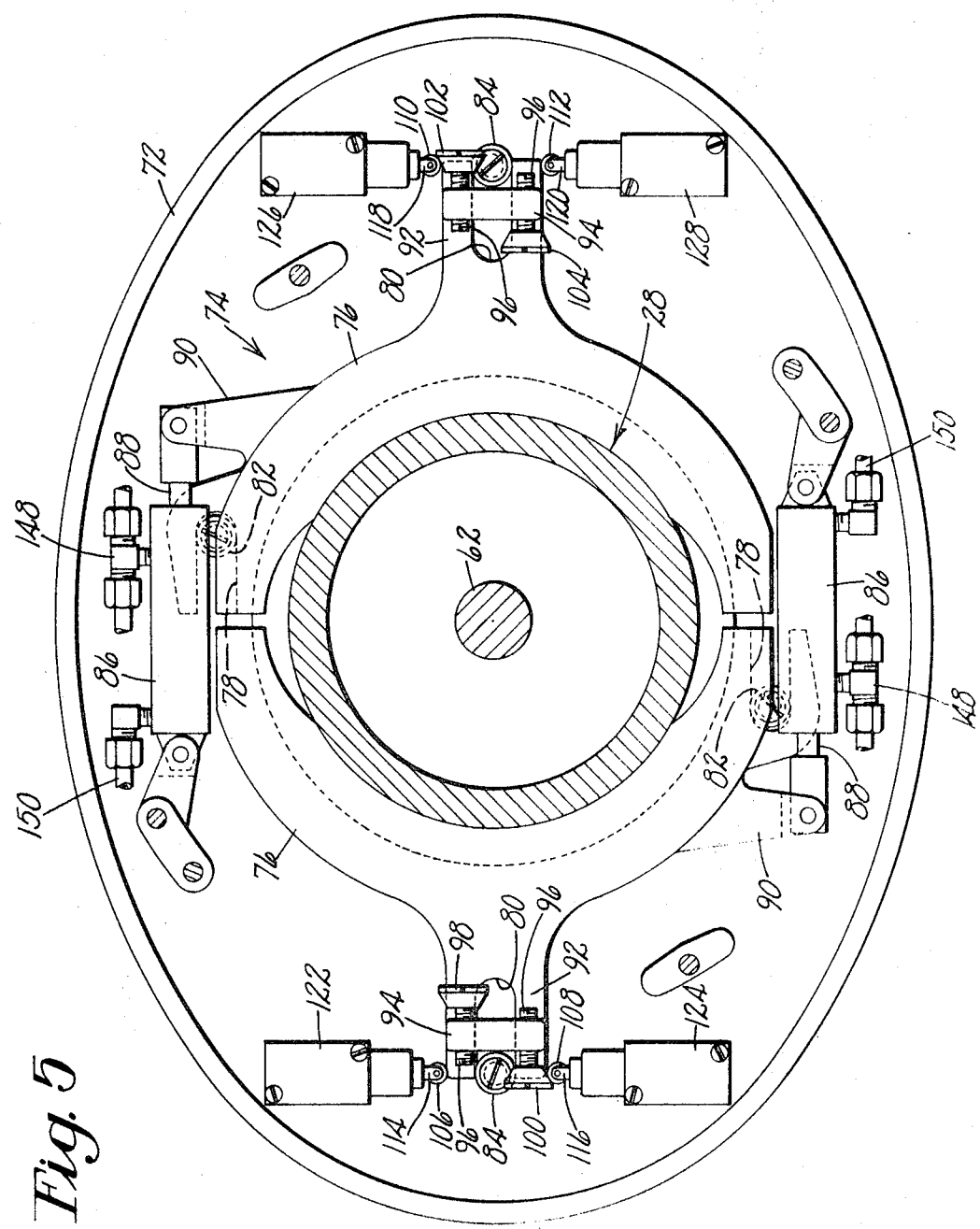
FIG. 5 is a plane view taken along line V–V of FIG. 4 showing the high force locking mechanism in the engaged position.

Connected to the underside of the piston member 30 is an annular tray 72 (FIGS. 1 and 4) in which is disposed a mold lock means 74 (FIGS. 3 and 5) for engaging the circumferential groove 28 of the core member 26. The mold lock means comprises opposed arcuate mold lock segments 76 having slots 78, 80 which receive guide pins 82, 84 respectively, the mold lock segments being movable relatively to the guide pins. Mold lock cylinders 86 are disposed in the tray 72 and have piston rods 88 extending therefrom and connected to lugs 90 which comprise projections from the mold lock segments 76. Movement of the piston rods 88 from an extended position, in which the mold lock segments are withdrawn from the core member 26, as shown in FIGS. 1 and 3, to the drawn in position shown in FIG. 5 causes the mold lock segments to engage the circumferential groove 28 of the core member 26, as shown in FIGS. 4 and 5.

The slots 80 in the arcuate mold lock segments 76 are defined by bifurcated portions 92 of the segments 76, which portions carry brackets 94 supporting headed screws 96. The screws 96 comprise cam members 98, 100, 102, 104 which are engageable with rollers 106, 108, 110, 112, respectively, mounted on the free ends of actuating plungers 114, 116, 118, 120 of switches 122, 124, 126 and 128, respectively. Thus, movement of the mold lock segments 76 causes operation of the switches 122, 124, 126, 128 for purposes to be described hereinbelow.

Figure 7:
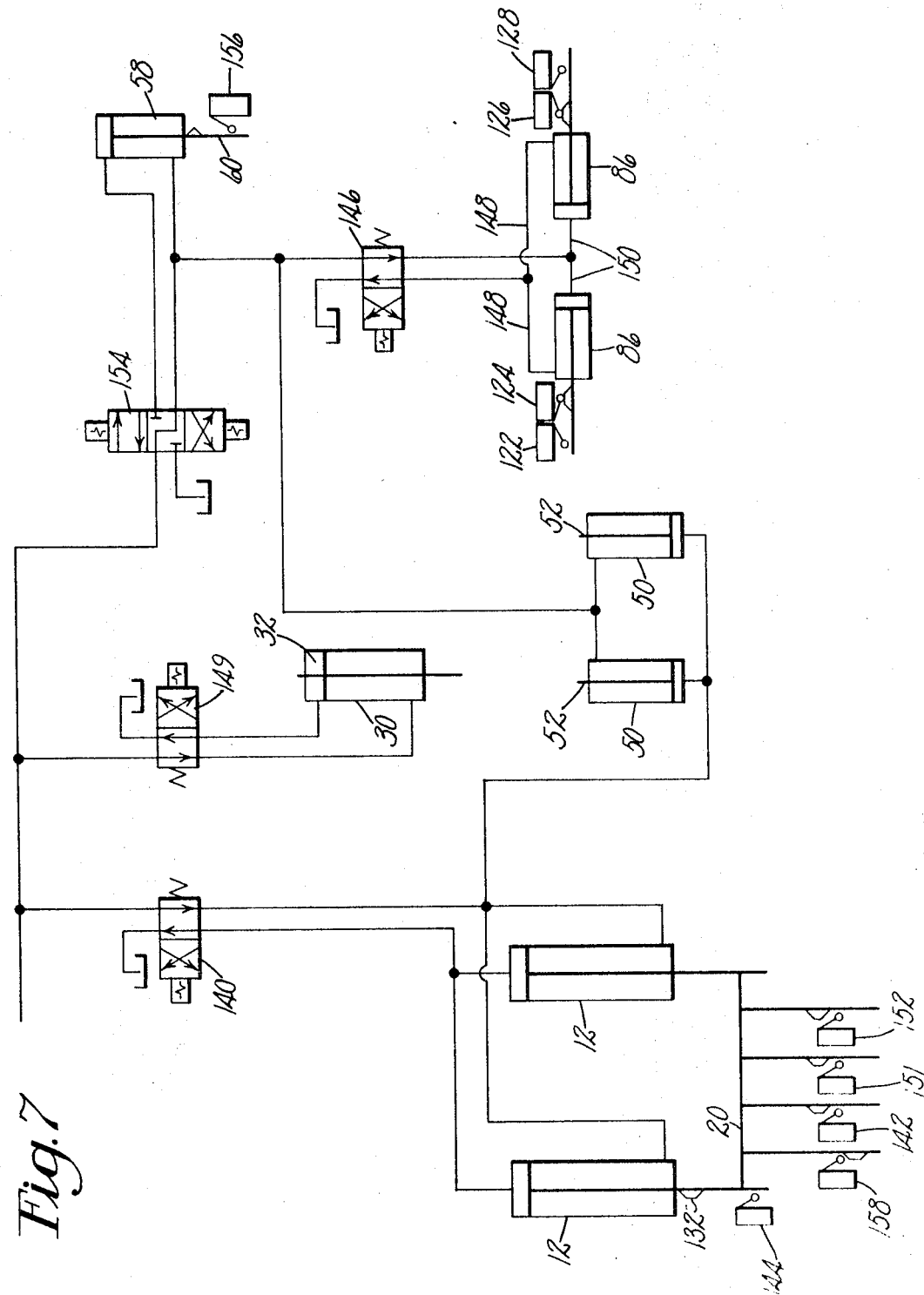
FIG. 7 is a diagrammatic representation of a simplified hydraulic circuit for the apparatus.

In operation, the core member 26 is raised, as seen in FIG. 1, in preparation for a molding cycle. By either automatic or manual means a lift cylinder valve 140 (FIG. 7) is shifted to pressurize the head ends of the lift cylinders 12 and exhaust the other ends, whereby to move the platen 20 toward the platen 4. As the platen 20 descends, it operates a low-speed switch 142 (shown only in FIG. 7) when the movable platen 20 is about an inch from the bottom end of the stroke. The switch 142 operates to slow the rate of descent of the platen 20, as for example, from approximately 14 inches per second to approximately 1 inch per second. As the platen 20 descends, so also does the core member 26 attached thereto, the core member being acted upon by guide means comprising a set of rollers 130 (FIGS. 1, 2 and 4) which serve to support and align the core member.

When the mold members 6, 22 are about one-sixteenth inch apart, a limit switch 144 (FIGS. 6 and 7) is actuated by a plunger 132 (FIG. 6) fixed to the mounting plate 59 and engageable with a pivotally mounted actuator 134 connected to a portion of the clamp piston member 30. Actuation of the limit switch 144 causes shifting of a mold lock control valve 146 which pressurizes the rod ends of the mold lock cylinders 86 through lines 148 (FIGS. 3, 5 and 7) and exhausts the piston ends of the mold lock cylinders through lines 150. Pressure on the rod ends of the mold lock cylinders causes the piston rods 88 to be drawn into the cylinders 86 whereby to move the mold lock segments 76 from the position shown in FIGS. 1 and 3 toward the core member 26 which has moved from the position shown in FIG. 1 to the position shown in FIG. 4. Thus, the groove 28 is in alignment with the mold lock segments 76 and receives the mold lock segments as shown in FIGS. 4 and 5.

Inasmuch as the limit switch 144 is mounted on the upper platen 10 (FIG. 6), the actuator 134 is mounted on the clamp piston member 30, and the plunger 132 is mounted on the core member 26 by way of the mounting plate 59, it is evident that a proper relationship among the upper platen, clamp piston member and core member must exist before the mold lock control valve is operated to initiate the locking phase. Thus, the limit switch 144 assures the proper alignment of the mold lock segments 76 with the groove 28 prior to the inward movement of the mold lock segments.

As the mold lock segments 76 move inwardly to engage the core member 26, the cam members 100 and 102 actuate the switches 124 and 126 which cause shifting of a clamp cylinder valve 149 to direct high pressure fluid to the groove 32, forcing the clamp piston member 30, and therefore the mold lock segments 76 and core members 26, downwardly to move the movable mold member 22 into engagement with the stationary mold member 6 under high force.

When the pressure in the groove 32 reaches a desired level, as for example 2000 p.s.i., a signal from a pressure switch (not shown) initiates an injection cycle. Injection molding material is then injected into a mold cavity defined by the mold members 6, 22 until the mold is filled. Upon filling of the mold cavity the injection operation is terminated by means not shown but known in the art.

A timer (not shown) may be utilized to delay further machine activity until the injected material has had sufficient time in which to solidify. Upon passage of the preset length of time the clamp cylinder valve 149 is shifted to relieve pressure in the groove 32. When the pressure decreases to a desired level, usually atmospheric, a second pressure switch (not shown) is actuated which shifts the mold lock control valve 146 to reverse pressure in the mold lock cylinders 86, causing the mold lock segments to be withdrawn from the core member 26.

Withdrawal of the mold lock segments 76 causes the cam members 98, 104 to actuate the switches 122 and 128 respectively, which cause the lift cylinder valve 140 to shift, whereby to pressurize the rod ends of the lift cylinders 12 to move the platen 20 upwardly and away from the platen 4. Shifting of the lift cylinder valve 140 also directs pressurized fluid to the piston ends of the breakaway cylinders 50, driving the breakaway cylinder piston rods 52 upwardly against the underside of the breakaway plate 54 which is connected to the core member 26. Thus, the breakaway cylinders assist the lift cylinders in starting the movable platen in its upward movement.

After the movable mold member has broken away from the stationary mold member a limit switch 151 (FIG. 7) is tripped by the platen and operates to increase the movable platen velocity, as for example, from approximately 4 inches per second to approximately 18 inches per second.

Further upward travel of the core member 26 actuates a knockout switch 152 which shifts a knockout valve 154 to pressurize the head end of the knockout cylinder 58, forcing the piston rod 60 and extension 62 and plunger 64 downwardly, whereby to move the knockout plate 66 and knockout rods 68 from the position shown in FIG. 4 to substantially the position shown in FIG. 1, thereby to force out of the movable mold member cavity 70 a molded article. At the end of the knockout stroke, determined by engagement of the stop rods 71 with the piston member 30, a limit switch 156 is actuated which reverses the action of the knockout cylinder 58 to withdraw the rods 68.

As the movable platen 20 approaches the top of its stroke, it actuates a limit switch 158 which stops the moving platen. If the platen 20 settles down from its uppermost position to the extent that the switch 158 is released, the fluid circuit will be recycled to raise the platen back to the top of its stroke.

A selector switch (not shown) may be employed to permit operation of the machine in any one of three methods: automatic, semiautomatic or manual. If the selector switch is in the automatic position the above-described cycle will repeat continuously. If in the semiautomatic condition, one cycle of operations occurs automatically, but the system stops as the movable platen reaches the uppermost position. A new cycle is started by a manual operation, as by the closing of a safety door (not shown) or by pushing a button. Finally, the machine may be operated "manually" wherein each operation is individually controlled by an operator using pushbuttons.

If a new mold assembly is to be inserted in the machine and is of a different thickness than the previously used mold assembly, the drive sprocket 42 may be rotated to cause simultaneous rotation of the sprocket 38 whereby to rotate the nuts 34 to raise or lower the upper platen as desired.

Since certain obvious changes may be made in the illustrated device without departing from the scope of the invention, it is intended that all matters contained herein be interpreted in an illustrative and not a limiting sense.

Having thus described our invention, what we claim as new and desire to secure by Letters Patent of the United States is:

1. Injection molding press comprising a first stationary platen for mounting a first mold member, a second stationary platen in alignment with said first platen and spaced therefrom, a movable platen disposed between said stationary platens for mounting a second mold member, drive means mounted on said second stationary platen and connected to said movable platen to move said movable platen from a first position removed from said first stationary platen to a second position closer to said first stationary platen and such that said second mold member is proximate to said first mold member, a core member connected to said movable platen and extending through an opening in said second stationary platen, a collar slidably mounted on said core member and slidably disposed in said opening, said collar having a flange having a surface in a plane generally parallel to the plane of the mold mounting surfaces of the mold mounting platens, said core member having a widthwise groove therein, lug means connected to said collar and movable for engagement with said groove, whereby to lock said collar to said core member, and a chamber defined by said collar, said collar flange, and said second stationary platen for receiving fluid under pressure whereby to exert a force upon said collar flange whereby to force said core member, and thereby said movable platen and thereby said second mold member in a direction toward said first mold member to clamp said mold members together.

2. The invention according to claim 1 including guide means mounted on said second stationary platen and engageable with said core member to support said core member and maintain said core member in alignment with said collar member.

3. The invention according to claim 2 in which said guide means comprise roller members.

4. The invention according to claim 1 including means for assuring alignment of said core member groove and said lug means prior to locking movement of said lug means.

5. A press for clamping together a mold assembly for use in high pressure injection molding, the press comprising a base, a stationary platen fixed to said base for supporting a first mold member, tie bar means mounted on said stationary platen and extending therefrom, a second platen mounted on said tie bar means and removed from said stationary platen, a movable platen mounted on said tie bar means and disposed between said stationary platen and said second platen, said movable platen being adapted for mounting a second mold member, means mounted on said second platen for moving said movable platen along said tie bar means toward said stationary platen whereby to position said second mold member proximate to said first mold member, a core member fixed to said movable platen and extending through an opening in said second platen, locking means mounted on said second platen and receivable by said core member after operation of said moving means to move said second mold member proximate to said first mold member, and means associated with said second platen for forcing said locking means, and thereby said core member and said movable platen, toward said stationary platen whereby to firmly clamp together the first and second mold members, a clamp piston member mounted on said second platen and disposed between said core member and said second platen, the locking means being secured to the clamp piston member, and the second platen having a chamber therein defined in part by said clamp piston member, said chamber being adapted to receive high pressure fluid.

6. The invention according to claim 5 in which said locking means comprises mold lock segments and said core member is provided with peripheral groove means for receiving said segments.

7. The invention according to claim 5 in which said locking means comprises mold lock segments movable responsive to the operation of said moving means to engage peripheral groove means disposed in said core member.